United States Patent
Schneider

(10) Patent No.: US 8,867,738 B2
(45) Date of Patent: Oct. 21, 2014

(54) METHOD AND DEVICE FOR REDUCING VECTORING-ENHANCED NOISE IN COPPER TELEPHONE LOOPS

(71) Applicant: Telebyte, Inc., Hauppauge, NY (US)

(72) Inventor: Kenneth S. Schneider, Plainview, NY (US)

(73) Assignee: Telebyte, Inc., Hauppauge, NY (US)

( * ) Notice: Subject to any disclaimer, the term of this patent is extended or adjusted under 35 U.S.C. 154(b) by 37 days.

(21) Appl. No.: 13/828,381

(22) Filed: Mar. 14, 2013

(65) Prior Publication Data

US 2014/0269947 A1 Sep. 18, 2014

(51) Int. Cl.
*H04M 1/76* (2006.01)
*H04J 1/12* (2006.01)
*H04B 3/32* (2006.01)

(52) U.S. Cl.
CPC .......................................... *H04B 3/32* (2013.01)
USPC ............................................ 379/417; 370/201

(58) Field of Classification Search
None
See application file for complete search history.

(56) References Cited

U.S. PATENT DOCUMENTS

2012/0093204 A1* 4/2012 Al-Dhahir et al. ............. 375/222
2012/0281738 A1* 11/2012 Clausen et al. ................ 375/219

OTHER PUBLICATIONS

"Keep the Noise Down" by Roy Rubenstein New Electronics Nov. 27, 2012 p. 29-30.*

* cited by examiner

*Primary Examiner* — Fan Tsang
*Assistant Examiner* — Jeffrey Lytle
(74) *Attorney, Agent, or Firm* — Kenyon & Kenyon LLP

(57) ABSTRACT

A method and a corresponding device for reducing enhanced noise generated as a result of applying vectoring to signals transmitted and subsequently received over a plurality of copper telephone loops involve receiving a set of intermediate values, which correspond to estimates of the transmitted signals. The intermediate values are generated by applying a vectoring procedure to initial samples of the received signals. The intermediate values are demodulated. At least one demodulated value is selected as a final estimate of a corresponding transmitted signal. The initial samples are then refined by removing each initial sample that has a corresponding selected demodulated value. The vectoring procedure, the demodulating, the selecting, and the refining are each repeated using the refined samples in place of the initial samples to generate new intermediate values that have reduced noise.

20 Claims, 7 Drawing Sheets

METHOD AND DEVICE FOR REDUCING VECTORING-ENHANCED NOISE IN COPPER TELEPHONE LOOPS

BACKGROUND INFORMATION

The explosive growth of the Internet and the resulting connectivity demands of the World Wide Web have created a need for ever-increasing data rates. This has resulted in a demand for what is referred to as "broadband connectivity", e.g., data rates from 1 Mbps to 1 Gbps. In implementing broadband connectivity, the physical transmission media and how it is used present limitations to transmission speed. Of the three basic transmission media (copper telephone cable, coaxial and fiber optic cable, and wireless over-the-air) the one that deserves the most attention, from the viewpoint of broadband connectivity, is unquestionably copper telephone cable because it is ubiquitous, and therefore allows broadband connection to remote residences around the world.

Telephone companies implement broadband connectivity using Digital Subscriber Line (DSL) technology, which involves the local loop that connects end-users, via their Customer Premises Equipment (CPE) to the nearest telephone company Central Office (CO). Each local loop is uniquely assigned to connect a respective end-user residence to the CO.

Copper telephone plants were originally built for analog voice transmission. A telephone handset was placed at the customer end of the local loop. The telephone was linked by the local loop to a dedicated network interface and switching equipment at the CO end of the loop. There was no attempt to coordinate the transmissions, the traffic activity, the signals and signal processing, on the plethora of local loops connected to different end-users. Thus, each local loop was considered a separate entity. Multiple-Input Multiple-Output (MIMO) techniques abandon this approach by considering the local loops in groups, known as binders. For instance, in the United States, there may typically be 25 to 50 loops in a binder. Binders are then grouped in what is called "the cable." MIMO techniques, of which vectoring is one, seek to increase broadband connectivity rates by coordinating data transmission in the grouped local loops. Vectoring is especially important because, not only does it increase broadband connectivity rates on its own, but it also enhances the performance of other MIMO techniques such as bonding and phantom circuits.

Vectoring seeks to enhance broadband connectivity rates by reducing interference, i.e., the noise that is present in the local loop environment. This interference enters the receiver/demodulator along with the information-bearing modulation waveforms and affects the reliability of demodulation, thus limiting the data rate. Vectoring does not attempt to cancel all interference. Rather, its purpose is to cancel crosstalk, and in particular Far End Crosstalk (FEXT), which originates from transmissions on other loops in the same group. FEXT originates from both capacitive and inductive coupling between local loops, and is the result of an imbalance of the distributed mutual capacitances and mutual inductances between any two loops. This same coupling mechanism is also the source of Near End Crosstalk (NEXT).

While vectoring substantially eliminates all FEXT, it does not leave the DSL operating environment noise-free. Other noise sources, which are not subject to cancellation by vectoring, may still exist, including impulse noises, radio frequency interference (RFI), background Additive White Gaussian Noise (AWGN) and alien FEXT (e.g., from cables of nearby groups). Additionally, vectoring has the undesirable effect of increasing this residual noise, generating enhanced noise that did not exist prior to applying vectoring.

Accordingly, there exists a need for methods and devices that improve upon conventional vectoring techniques, and that in particular operate to reduce the enhanced noise produced by vectoring.

SUMMARY

Example embodiments of the present invention relate to suppressing vectoring-enhanced noise by using a combination of List Decoding, Soft Decision Demodulation and Decision feedback to accomplish this suppression.

An example embodiment of a method and a corresponding device for reducing vectoring-enhanced noise involve receiving a set of intermediate values, which correspond to estimates of the transmitted signals. The intermediate values are generated by applying a vectoring procedure to initial samples of the received signals. The intermediate values are demodulated. At least one demodulated value is selected as a final estimate of a corresponding transmitted signal. The initial samples are then refined by removing each initial sample that has a corresponding selected demodulated value. The vectoring procedure, the demodulating, the selecting, and the refining are each repeated using the refined samples in place of the initial samples to generate new intermediate values that have reduced noise, that is, it uses feedback on the decisions of the selected demodulated values.

DETAILED DESCRIPTION

The present invention relates to a method and a corresponding device for reducing vectoring-enhanced noise in copper telephone loops. Example embodiments will be described in connection with vectoring that is applied to transmission in local loops along the upstream direction, from customer CPEs to the CO. However, the example embodiments may also be applicable to vectoring of transmissions in the downstream direction, i.e., from the CO to the end-users.

Figure 1:
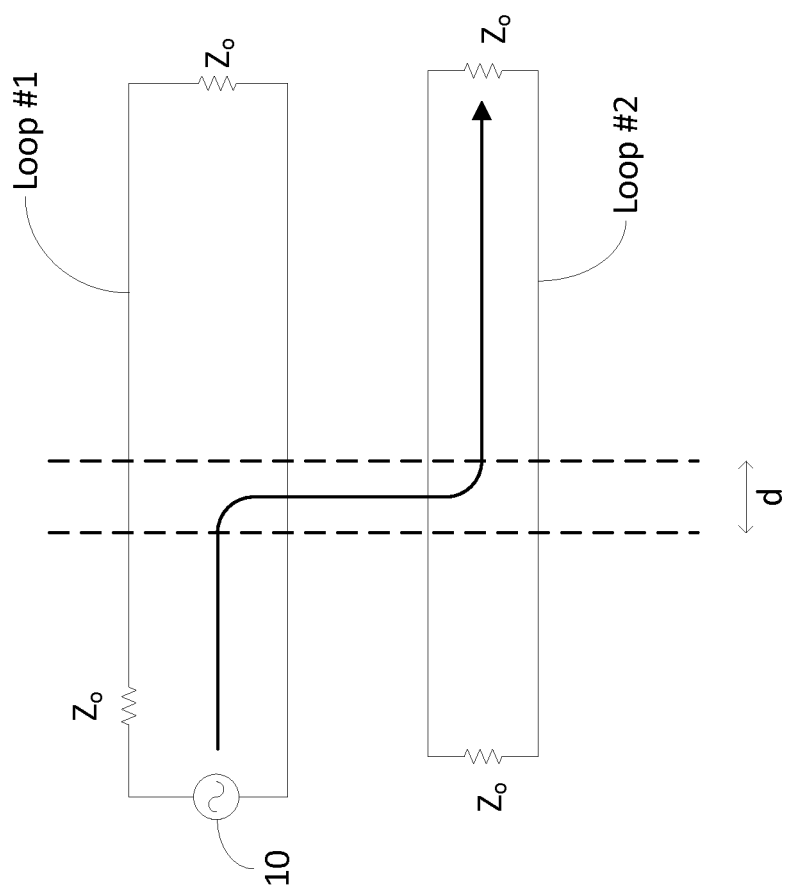
FIG. 1 is a circuit model illustrating the relationship between the direct modulation waveforms in a pair of local loops and the FEXT between these loops.

FIG. 1 is a circuit model illustrating the relationship between the direct modulation waveforms in a pair local loops and the FEXT between these loops. In FIG. 1, a transmitter is represented as an analog signal source 10 and a source impedance of value Zo, and transmits a signal at the left of loop 1 towards a receiver (represented as a load impedance of value Zo) at the right end of the loop. This is referred to as the direct path in a loop. In addition to traversing the loop 1 to the receiver, the direct path signal couples into loop 2, traversing along the right of loop 2 to a load (represented as another impedance of value Zo) and interfering with the direct path signal in loop 2. Since this crosstalk interferes at the far end, remote from where it is being generated, it is commonly referred to as FEXT. The coupling occurs along a section of the loops which has a length d.

Figure 2:
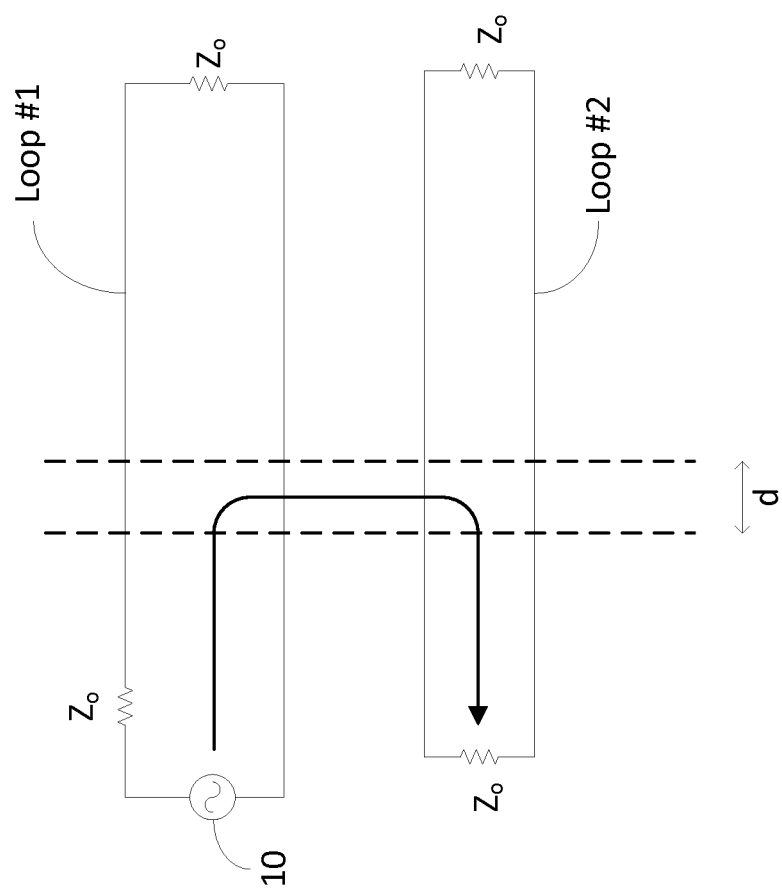
FIG. 2 is a circuit model illustrating the relationship between the direct modulation waveforms and the NEXT between the loops in FIG. 1.

FIG. 2 is a circuit model illustrating the relationship between the direct modulation waveforms in a pair of local loops and the NEXT between these loops. FIG. 2 shows the same components as FIG. 1. In FIG. 2, the same coupling occurs, except after coupling into loop 2, the crosstalk doubles back and interferes with the loop 2 receiver on the left, the same side as where the loop 1 signal is generated, which is why it is commonly referred to as NEXT. NEXT is generally of a much higher level than FEXT. However, in VDSL2 (the current generation of DSL technology) the transmissions in the upstream CPE-to-CO direction and the downstream CO-to-CPE direction have been conveniently separated in frequency by careful "band planning." So in contrast to earlier DSL versions, NEXT does not present as much of a limitation to performance.

Vectoring could in principle be used with both NEXT and FEXT. However, it presents the greatest payoff when used with FEXT since, as explained above, NEXT is a lesser problem than FEXT. Therefore, the example embodiments will be described in connection with vectoring as applied to the reduction of FEXT, and in particular FEXT along the upstream direction. However, one of ordinary skill in the art would understand that the example embodiments may also be applied towards reduction of NEXT, as well as transmission in the downstream direction.

Vectoring Example

Figure 3:
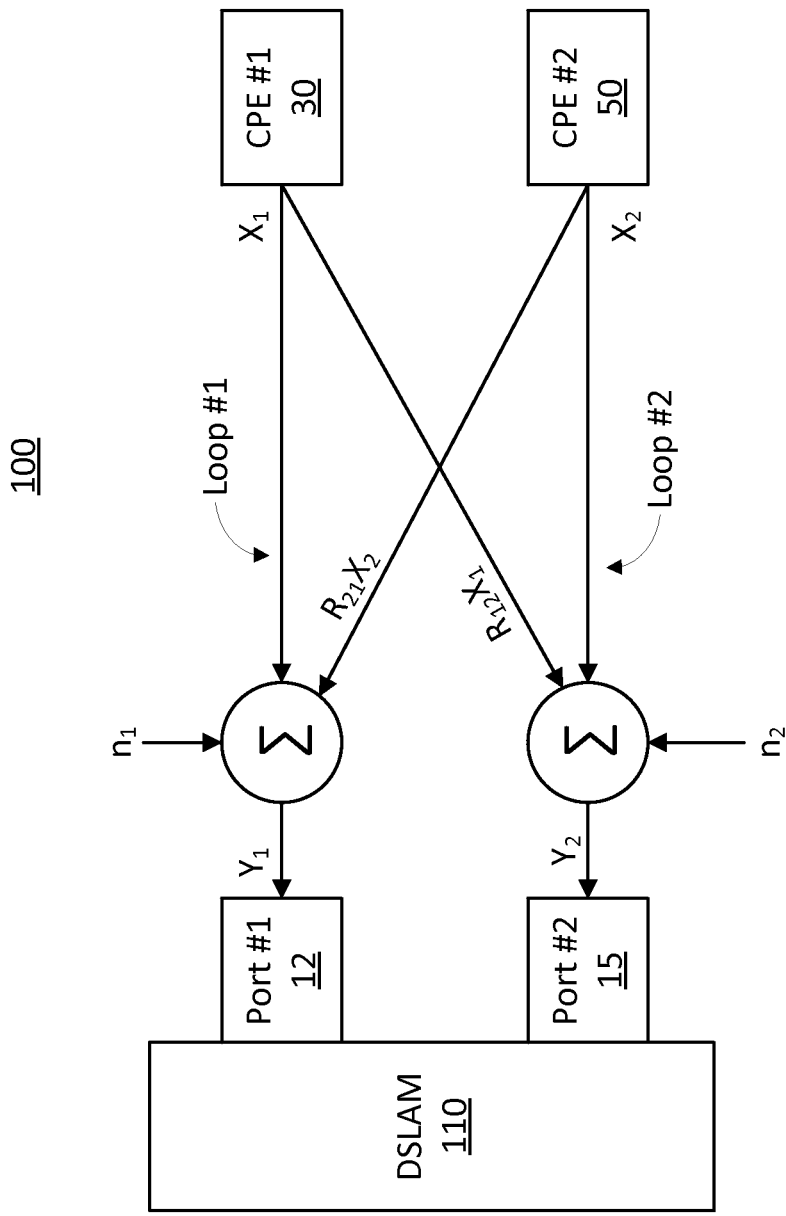
FIG. 3 is a block diagram of a two loop system to which vectoring may be applied.

FIG. 3 is a block diagram of a system 100 to which vectoring may be applied. For illustration purposes, only two loops 1, 2 are shown, each of the loops connecting a respective CPE 30, 50 to a corresponding port 12, 15 of a Digital Subscriber Line Access Multiplexer (DSLAM) 110 at the CO. Each CPE 30, 50 may comprise a data source and a modulator, which modulates the data from the data source for transmission to the DSLAM 110. For discussion purposes, assume that the data source is binary and outputs discrete bipolar pulses, +1 and −1, respectively corresponding to digital values of "1" and "0" every 1/Rs seconds, where "Rs" is the data rate. The output streams of the CPEs are labeled $X_1$ and $X_2$ and correspond to the modulated data. The output streams are assumed to be synchronized, so that at some discrete time instance "T", both $X_1$ and $X_2$ are emitted from their respective CPEs. Likewise, it is assumed that $Y_1$ and $Y_2$, which are the respective inputs to the DSLAM ports 12, 15, are also synchronized so that $Y_1$ and $Y_2$ arrive at the same time.

The DSLAM input is composed of three components. For example, $Y_1$ is composed of $X_1$, i.e., the information bit that the CPE sent. $Y_1$ is also composed of crosstalk, specifically FEXT resulting from the transmission occurring in loop 2. This FEXT is represented by the component $R_{21}X_2$. Here $R_{21}$ is a number between "−1" and "1", is referred to as the FEXT correlation coefficient or simply "correlation coefficient", and represents a degree of FEXT produced in loop 1 as a result of transmissions in loop 2. The value of this correlation coefficient is typically experimentally determined by analyzing transmissions along the loops. The third component of $Y_1$ is a noise sample $n_1$. The DSLAM input $Y_2$ is also composed of three components, similar to those of $Y_1$. Thus, the DSLAM inputs can be expressed by the following equations:

$$Y_1 = X_1 + R_{21}X_2 + n_1 \quad (1)$$

$$Y_2 = X_2 + R_{12}X_1 + n_2 \quad (2)$$

Prior to the development of vectoring, $X_1$ and $X_2$ were considered "information signal" terms, and $R_{21}X_2$ and $R_{12}X_1$ were considered "interference" terms. Taking $Y_1$ as an example, a demodulator at port 12 of the DSLAM would examine $Y_1$ and decide which possible value of $X_1$ (from a set of allowed values—in this example +1 or −1) was closest to it, and demodulate $Y_1$ as that value. For example, if $Y_1$ is 0.7, it will be decided that $X_1$ is +1. This type of demodulation is known as "Maximum Likelihood" demodulation and works well provided that $R_{21}X_2 + n_1$ is not too large. A similar demodulation would occur for $Y_2$ at a demodulator of the port 15.

Vectoring takes a totally different approach. To understand vectoring, ignore the noise samples, $n_1$ and $n_2$ for the moment (these noise samples correspond to the noise that is not addressed by conventional vectoring, and which are the sources of the vectoring-enhanced noise to be explained later), so that equations 1 and 2 become:

$$Y_1 = X_1 + R_{21}X_2 \quad (3)$$

$$Y_2 = X_2 + R_{12}X_1 \quad (4)$$

Vectoring relies on the fact that at the input of the DSLAM, the output samples $Y_1$ and $Y_2$ are known, e.g., they can be measured. The correlation coefficients, $R_{21}$ and $R_{12}$ are also known. Accordingly, equations 3 and 4 are solvable as two equations with two unknowns, $X_1$ and $X_2$. In principle, they can be solved unless there is the degenerate case of $R_{21} = R_{12} = 1$. By solving these equations for $X_1$ and $X_2$, the FEXT can be totally canceled. The solutions of these equations are:

$$X_1 = (1/(1 - R_{12}R_{21})) * (Y_1 - R_{21}Y_2) \quad (5)$$

$$X_2 = (1/(1 - R_{12}R_{21})) * (-R_{12}Y_1 + Y_2) \quad (6)$$

The FEXT is thus canceled using linear algebra. This can be generalized using the usual nomenclature of linear algebra. First, equations 5 and 6 are expressed using two-dimensional vectors $\underline{X}$ and $\underline{Y}$, a 2×2 matrix R (referred to as the "Correlation Matrix" or alternatively the "Channel Matrix"), and an inverse matrix W that is the inverse of R:

$$\underline{X} = \begin{bmatrix} X_1 \\ X_2 \end{bmatrix}, \underline{Y} = \begin{bmatrix} Y_1 \\ Y_2 \end{bmatrix}, R = \begin{bmatrix} 1 & R_{12} \\ R_{21} & 1 \end{bmatrix}, W = \begin{bmatrix} W_{11} & W_{12} \\ W_{21} & W_{22} \end{bmatrix}$$

where $W = R^{-1}$ and $WR = I$, the identity matrix.

Thus, equations 3 and 4 can be written more concisely as:

$$\underline{Y} = R\underline{X} \quad (7)$$

Next, the FEXT is canceled by, at the DSLAM 110, taking the known vector $\underline{Y}$, which can be measured directly from the demodulator outputs, and multiplying it by the matrix W, which is calculated as the inverse of the known matrix R. As illustrated in the next equations, this yields the original information vector, $\underline{X}$:

$$W\underline{Y} = WR\underline{X} = R^{-1}R\underline{X} = I\underline{X} = \underline{X} \quad (8)$$

Thus, FEXT cancellation can be achieved through coordinated processing of $Y_1$ and $Y_2$, which was not possible when the loops were treated as completely separate entities.

Figure 4:
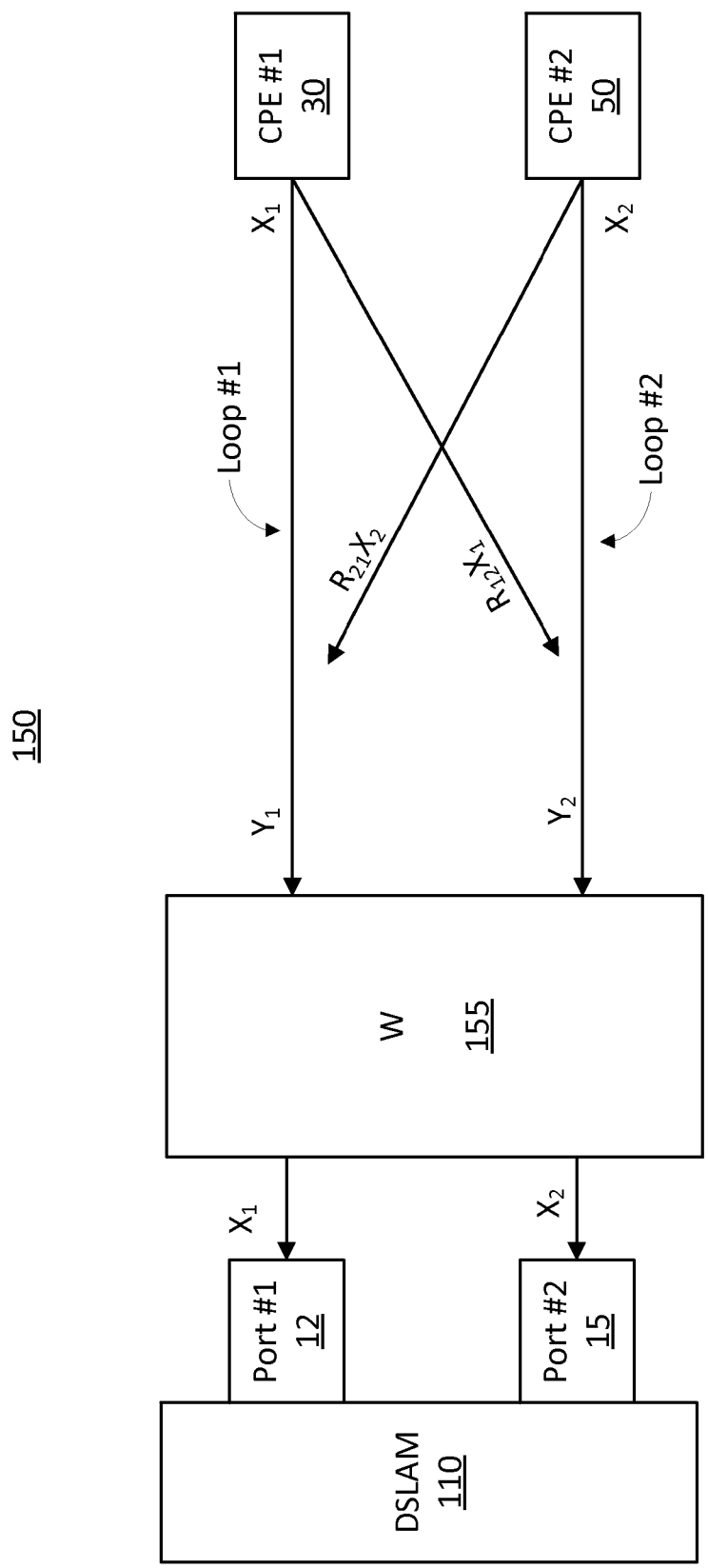
FIG. 4 is a block diagram illustrating vectoring in a two loop system.

In vectoring, the knowledge of $X_2$ obtained from observing $Y_2$ is used to remove the crosstalk component of $X_2$ from $Y_1$. Likewise a similar approach holds for $Y_2$. Instead of processing $Y_1$ and $Y_2$ individually, these values are now considered together as the vector $\underline{Y}$, hence the term "vectoring." The above processing is illustrated in FIG. 4, where the cancellation is performed by a block 155. The block 155 is shown as generating the input to the ports 12, 15. Alternatively, block 155 can be implemented as a post-input component in the DSLAM 110 or elsewhere at the CO, which component processes the inputs received by the ports 12, 15 to cancel the FEXT.

Based on the above description of vectoring, it can be seen that the following are required for vectoring to work: the transmissions should be synchronized in order to be able to form the vector $\underline{Y}$ (the entire vector $\underline{Y}$ must be available for processing). Further, the Correlation Matrix R must be obtained. Finally, the DSLAM (or other processing component that implements the vectoring) should have sufficient computational capability in order for the matrix multiplication $W\underline{Y}$ to be carried out. As previously mentioned, the example embodiments of the present invention relate to upstream transmission. This is because upstream communication is especially suited for vectoring, since these requirements are more readily satisfied at the CO end of the loop. In particular, the DSLAM has the entire vector $\underline{Y}$. Further, the CO can synchronize upstream transmissions so as to arrive simultaneously. Still further, the CO is also in the best position to invest in the equipment needed for vectoring. Nevertheless, this does not preclude downstream vectoring.

In the downstream direction, the CO again synchronizes the transmissions, but this time so that they are sent out from the DSLAM simultaneously rather than received simultaneously. Generally, the downstream CPEs cannot observe the complete vector $\underline{Y}$ because the CPEs are physically separated. Although there are some situations in which the CPEs are co-located, to solve this problem in the general case, the DSLAM can multiply $\underline{X}$ by W to form a "pre-distorted" vector as a substitute for $\underline{Y}$. The pre-distorted vector is what is actually transmitted to the CPEs. Each component of this substitute vector is transmitted to a respective CPE along a corresponding local loop. During the downstream transmission it is this pre-distorted vector which is subject to the FEXT crosstalk. The FEXT cancels the pre-distortion so that the correct value of $\underline{X}$ results and the correct components are received at the various CPEs. This is summarized by the following steps:

1. Forming $\underline{X}$ at the DSLAM.
2. Forming the pre-distorted vector as the product of $W\underline{X}$.
3. Transmitting the pre-distorted vector on the local loops
4. At the CPEs, receiving $\underline{X}$ since the pre-distorted vector cancels out the FEXT that is present at the CPE receivers, as shown in the equations below:

$$RW\underline{X}=RR^{-1}\underline{X}=I\underline{X}=\underline{X}$$

As the present invention relates primarily to upstream transmission, no further discussion of downstream transmission will be made. Instead, the cause of, and solution to, vectoring-enhanced noise will now be described in connection with upstream transmission.

Vectoring-Enhanced Noise

Returning to equations 1 and 2 above, these equations can be generalized to any N number of loops (where N is at least two) as follows:

$$\underline{Y}=R\underline{X}+\underline{n} \quad (9)$$

where $\underline{n}$ is the vector of noise samples, i.e., the background noise not canceled by vectoring, and defined as:

$$\underline{n} = \begin{bmatrix} n_1 \\ n_2 \\ \vdots \\ n_N \end{bmatrix}$$

Using vectoring, the inverse matrix W is calculated from the Correlation Matrix R and multiplies $\underline{Y}$ to produce an estimate of $\underline{X}$, which is referred to herein as a vector $\underline{\hat{X}}$:

Let $\underline{n}^{(1)}=W\underline{n}$. Then $\underline{\hat{X}}=W\underline{Y}=WR\underline{X}+W\underline{n}=I\underline{X}+W\underline{n}=\underline{X}+\underline{n}^{(1)}$ As seen in the above equations, vectoring has removed the FEXT, since there is no component of FEXT in $\underline{\hat{X}}$. However, instead of the noise vector n, there is a resultant noise vector, $\underline{n}^{(1)}$, which represents the enhanced noise. In the pre-vectoring situation each loop only had a single noise component, e.g. loop 1 had $n_1$. After vectoring, each loop now has a linear combination of all the noise samples $\underline{n}$. Thus, the noise affecting each loop in the upstream direction has increased. This is also apparent from the two-loop example, where W is given by:

$$W = (1 - R_{12}R_{21})^{-1} * \begin{bmatrix} 1 & -R_{12} \\ -R_{21} & 1 \end{bmatrix}$$

Thus, vectoring eliminated the FEXT crosstalk, but at the cost of increasing the effect of all of the other noises. From the equation for W above, it can be seen that the noise has been increased (enhanced) and that the increase gets worse with higher degrees of correlation, i.e., more loops results in a larger correlation matrix, and therefore the problem of enhanced noise gets worse. Accordingly, a tradeoff exists between the size of the vectored group (the number of loops vectored) and the enhancement of the un-canceled noise. In the absence of any un-canceled noise, the size of the vectored group should ideally be as large as possible to cancel the most amount of FEXT. When un-canceled noise is present, there will be a group size beyond which the benefits of FEXT cancellation on broadband connectivity rates will be completely eliminated. The increase in noise will negate any improvement due to crosstalk elimination.

It is important to note that the components of $\underline{\hat{X}}$ are real-valued quantities, which are not at the allowed information signal levels for $\underline{X}$ (e.g., +1 or −1) because of the presence of the noise vector, $\underline{n}^{(1)}$. The post-vectoring estimate $\underline{\hat{X}}$ would have each of its components applied to a "Maximum Likelihood" threshold detector for final demodulation to the nearest allowed level. Each instance of final demodulation of a component of $\underline{\hat{X}}$ is referred to as making a "hard decision," which in the case of Maximum Likelihood demodulation, basically quantizes the component to the closest allowed information signal level. The rationale behind this demodulation is that the values closest to an allowed level (e.g., the component for which the difference between its value and an allowed level is the smallest) are the least likely to have been influenced by noise. The result of this hard-decision demodulation is a vector $\underline{\hat{\hat{X}}}$. Each of its components is an allowed information signal level. The presence of this enhanced noise $\underline{n}^{(1)}$ introduces the possibility of errors in this final, hard-decision demodulation, even with FEXT completely canceled.

Reducing Vectoring-Enhanced Noise (Example Method with Two Loops)

An example embodiment of a method for reducing vectoring-enhanced noise will now be described. As will be explained, the method may include a combination of the following processing techniques: List Decoding, Soft-Decision Demodulation, and Decision Feedback.

The method may be implemented as an iterative technique, each iteration referred to herein as a "cycle". With each cycle, the enhanced noise is further reduced. The number of cycles can be up to N, which is the number of loops in the vectoring group where FEXT is being canceled. Alternatively, the method may be non-iterative, with only a single cycle in which a portion of the enhanced noise is eliminated.

For discussion purposes, the following descriptive labels will be used to refer to the various terms previously described:
- $\underline{X}$: the "Information Vector".
- $\underline{Y}$: the "Processing Input Vector".
- $\underline{n}$: the "Enhanced Noise Vector".
- R: as previously mentioned, is the Correlation Matrix.
- W: as previously mentioned, is the inverse of R.
- $\underline{\hat{X}}$: the "Processing Output Vector".
- $\underline{\hat{\hat{X}}}$: the "Decision Output Vector".

At the start of the method, the Information Vector $\underline{X}$, the Processing Input Vector $\underline{Y}$, the Enhanced Noise Vector $\underline{n}$, the Processing Output Vector $\underline{\hat{X}}$, and the Decision Output Vector $\underline{\hat{\hat{X}}}$ each have a dimension equal to N.

In this embodiment, the number of cycles is N and the cycles are numbered as Cycle(1), Cycle(2), ... Cycle(N), with Cycle(1) being the first and Cycle(N) being the last. For each cycle, the method calculates a respective Information Vector $\underline{X}$, Processing Input Vector $\underline{Y}$, Enhanced Noise vector $\underline{n}$, Correlation Matrix R and its inverse W, Processing Output Vector $\underline{\hat{X}}$, and Decision Output Vector $\underline{\hat{\hat{X}}}$. The following nomenclature is used: for Cycle(i), there is an $\underline{X}(i)$, $\underline{Y}(i)$, $\underline{n}(i)$, R(i), W(i), $\underline{\hat{X}}(i)$, and $\underline{\hat{\hat{X}}}(i)$. The dimension of these terms goes down in the same way as the cycle number goes up. For example, the dimension may go down by one each cycle, so that $\underline{X}(1)$ is N-dimensional, X(2) is (N−1)-dimensional, etc., while R(1) is N×N, R(2) is (N−1)×(N−1), etc. The extent to which the dimensions are reduced in each cycle is corresponds to the number of hard decisions made per cycle, as will be explained.

For Cycle(1) these vectors and matrices are the same as those formed by the vectoring example previously described, so that $\underline{X}(1)=\underline{X}$, $\underline{Y}(1)=\underline{Y}$, $\underline{n}(1)=\underline{n}$, R(1)=R, W(1)=W, $\underline{\hat{X}}(1)=\underline{\hat{X}}$, and $\underline{\hat{\hat{X}}}(1)=\underline{\hat{\hat{X}}}$. In other words, the initial values are the same as those generated through conventional vectoring.

Additionally, for each cycle, the method calculates an additional vector, Metric(i), which is defined as follows:

$$\text{Metric}(i)=|\underline{\hat{X}}(i)-\underline{\hat{\hat{X}}}(i)|$$

The combination of all Metric(i) values forms a vector whose components are equal to the absolute value of the difference between the corresponding components of $\underline{\hat{X}}(i)$ and $\underline{\hat{\hat{X}}}(i)$. The components of the Metric vector are all greater-than-or-equal to zero.

In Cycle(1), the Decision Output Vector $\underline{\hat{\hat{X}}}(1)$ is generated using the conventional vectoring previously described. Then all of the elements of Metric(1) are examined. The Metric component that has the smallest value is identified. This smallest-value component is referred to as the K(1)th component. From a statistical point of view this component, out of all N components, is the most likely, i.e., most probable. In other words, among all the components of $\underline{\hat{X}}(1)$, the K(1)th component is the most likely to be representative of its corresponding $\underline{X}(1)$ component. The method makes a hard decision on this K(1)th component, e.g., by setting $X_{K(1)}$ equal to $\hat{\hat{X}}_{K(1)}$ and putting this component of $\underline{X}$ aside for combination with other hard decisions (which occur in subsequent cycles) to form a final estimate of the $\underline{X}$ that was actually transmitted.

Choosing the component of Metric(1) with the smallest value is a form of what is known as "List Decoding," which involves choosing the smallest member from a list of likelihood functions, where the smallest members are—as is the case here with the components of the Metric vector—the most likely.

Making a hard decision on fewer than all of the components and deferring the decision on the remaining components is a form of what is known as "Soft-Decision Demodulation." In this example, only one hard decision is made in each cycle. In alternative embodiments, a plurality of hard decisions can be made each cycle, e.g., on some specified number of components corresponding to the lowest ones of the Metric vector.

In Cycle(2), processing returns to the input of the vectoring procedure, in which $\underline{Y}$ is multiplied by W. As a result of the hard decision in Cycle(1), the K(1)th component is removed from consideration by forming new vectors and matrices. The subsequent specific steps are as follows:

$\underline{X}(2)$ is formed by deleting the K(1)th component of $\underline{X}(1)$.

$\underline{Y}(2)$ is formed by deleting the K(1)th component of $\underline{Y}(1)$ and subtracting $R_{K(1)i} X_{K(1)}$, which is now equal to $R_{K(1)i} \hat{\hat{X}}_{K(1)}$, from the remaining components of $\underline{Y}(1)$. This is done for each "i" which is ≠K(1). For example, $R_{K(1)1} X_{K(1)}$ is subtracted from $Y_1(1)$ and $R_{K(1)2} X_{K(1)}$ is subtracted from $Y_2(1)$. The subtraction removes the FEXT contributed by the K(1)th component from each of the remaining components. Since the processing in Cycle(2) uses information from a decision in Cycle(1), it is a form of what is known as "Decision Feedback."

$\underline{n}(2)$ is formed by deleting the K(1)th component of $\underline{n}(1)$. Thus, the new vectors each have dimension N−1. As for the matrices:

R(2) is formed by deleting the K(1)th row and K(1)th column of R(1).

W(2) is the inverse of R(2). Thus, the new matrices each have dimension (N−1)×(N−1).

After forming the new vectors and matrices, processing continues in the same manner as in Cycle(1), with a new hard decision being made, i.e., on the K(2)th component. Importantly, the enhanced noise will have less of an effect compared to Cycle(1) because the dimension of $\underline{n}(2)$ is now reduced to N−1.

As was the case in the previous cycle, in Cycle(2) a new Processing Output Vector $\underline{\hat{X}}(2)$, a new Decision Output Vector $\underline{\hat{\hat{X}}}(2)$, and a new Metric(2) vector are formed—each of which now have a dimension of N−1. The "Maximum Likelihood" List Decoding is performed again, with the K(2)th component being identified and a hard decision made by setting aside $\hat{\hat{X}}_{K(2)}$ as the final estimate of $X_{K(2)}$. Because the dimension of $\underline{n}(2)$ is less than that of $\underline{n}(1)$, this new hard decision should be less effected by the enhanced noise, and therefore more reliable.

Since there are only two loops in this example, only two cycles have been described. However, as explained below in an example with N loops, this process may continue for N cycles, at the end of which N hard decisions have been made.

These N decisions together form the final estimate of X. With each cycle, the dimension of the enhanced noise vector decreases so that the effect of the enhanced noise also decreases, thereby improving the reliability of the processing compared to using vectoring alone.

The present invention thus improves the reliability of the hard decisions by carrying out N cycles of processing rather than one cycle. Because the dimensionality of vectors and matrices go down as the cycle number goes up, the amount of additional computation required for implementing the method above grows at a less-than linear rate with the size N of the vectoring group. The additional computation also increases the processing time, but again growing less-than linearly with N.

Reducing Vectoring-Enhanced Noise (Example Method with N Loops)

The example method previously described can be generalized for use with any N loops, where N is at least two. The generalized method will be described in connection with FIGS. 5A and 5B, which represent processing that occurs during the first two cycles in an N-loop system.

Figure 5A:
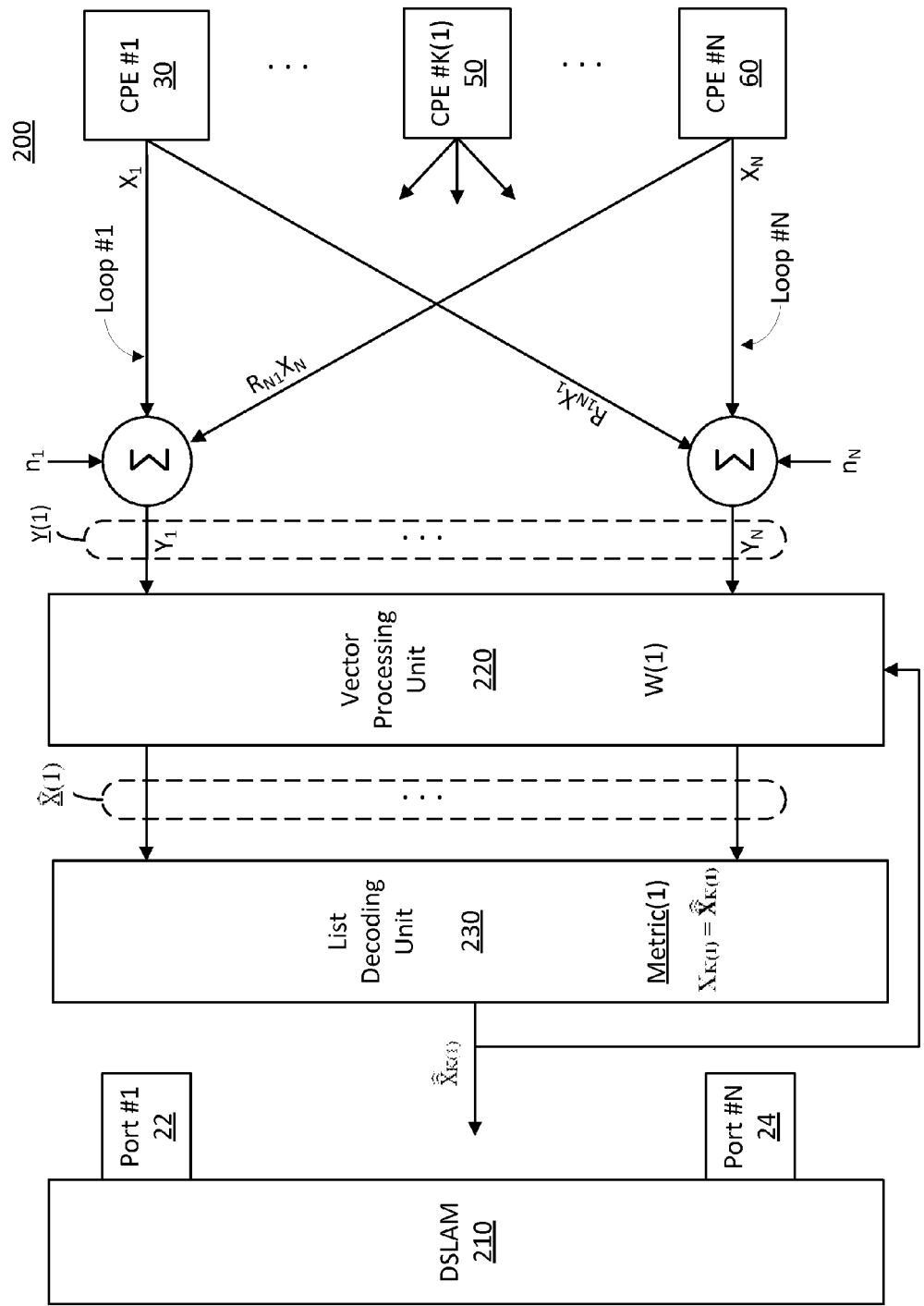
FIG. 5A shows the basic components of a system according to an example embodiment of the present invention.

FIG. 5A shows the basic components of a system 200 according to an embodiment of the present invention. The system 200 may include a DSLAM 210 connected to a plurality of CPEs 30, 50, 60 via respective local loops. The system 200 may also include a Vector Processing unit 220 and a List Decoding unit 230, which together perform a method for reducing vectoring-enhanced noise.

The Vector Processing unit 220 and the List Decoding unit 230 may be implemented in any combination of hardware or software. In one embodiment, both units 220, 230 are software modules executed by a processor of a computer, e.g., a control unit connected to or located within the DSLAM 110. The control unit may operate in conjunction with a conventional vectoring unit that performs vectoring to provide the initial inputs, i.e., the matrices and vectors at the beginning of Cycle(1), to the control unit. Alternatively, the control unit may replace a conventional vectoring unit by, in addition to performing the noise reduction, also performing vectoring.

FIG. 5A shows processing that occurs during Cycle(1). For simplicity, only the FEXT between the first and last loops are shown. FEXT generated from loop 1 into loop N is represented by the component $R_{1N}X_1$. FEXT generated from loop N into loop 1 is represented by the component $R_{N1}X_N$. In Cycle(1), the matrix W(1) is calculated as the inverse of R(1). The input to the Vector Processing unit 220 is Y(1), which is formed by adding together the respective direct path components, FEXT components, and noise components. The Vector Processing unit 220 multiplies this input by W(1) to form to generate the Processing Output Vector $\underline{\hat{X}}(1)$ as input to the List Decoding unit 230.

The List Decoding unit 230 performs Soft-Decision Demodulation to identify the most likely component of $\underline{\hat{X}}(1)$ by, first demodulating $\underline{\hat{X}}(1)$, e.g., using Maximum Likelihood demodulation, to generate the Decision Output Vector $\hat{\hat{X}}(1)$. Next, List Decoding unit 230 calculates the Metric(1) vector and selects the component of $\hat{\hat{X}}(1)$ that corresponds to the K(1) component of Metric(1). The List Decoding unit 230 then performs the Soft-Decision Demodulation by making a hard decision on only the selected component, e.g., by setting $X_{K(1)}$ equal to $\hat{\hat{X}}_{K(1)}$. The hard decision value $\hat{\hat{X}}_{K(1)}$ can be set aside and later combined with other hard decision values to form a vector of final estimated values that is sent to the DSLAM 210 for further processing. Alternatively, each hard decision can be transmitted separately, e.g., at the end of each cycle. In that case, control logic in the DSLAM 210 may, at the end of all the cycles, combine the hard decision values for further processing. Additionally, the hard decision value is fed back as an input to be used in Cycle(2).

Figure 5B:
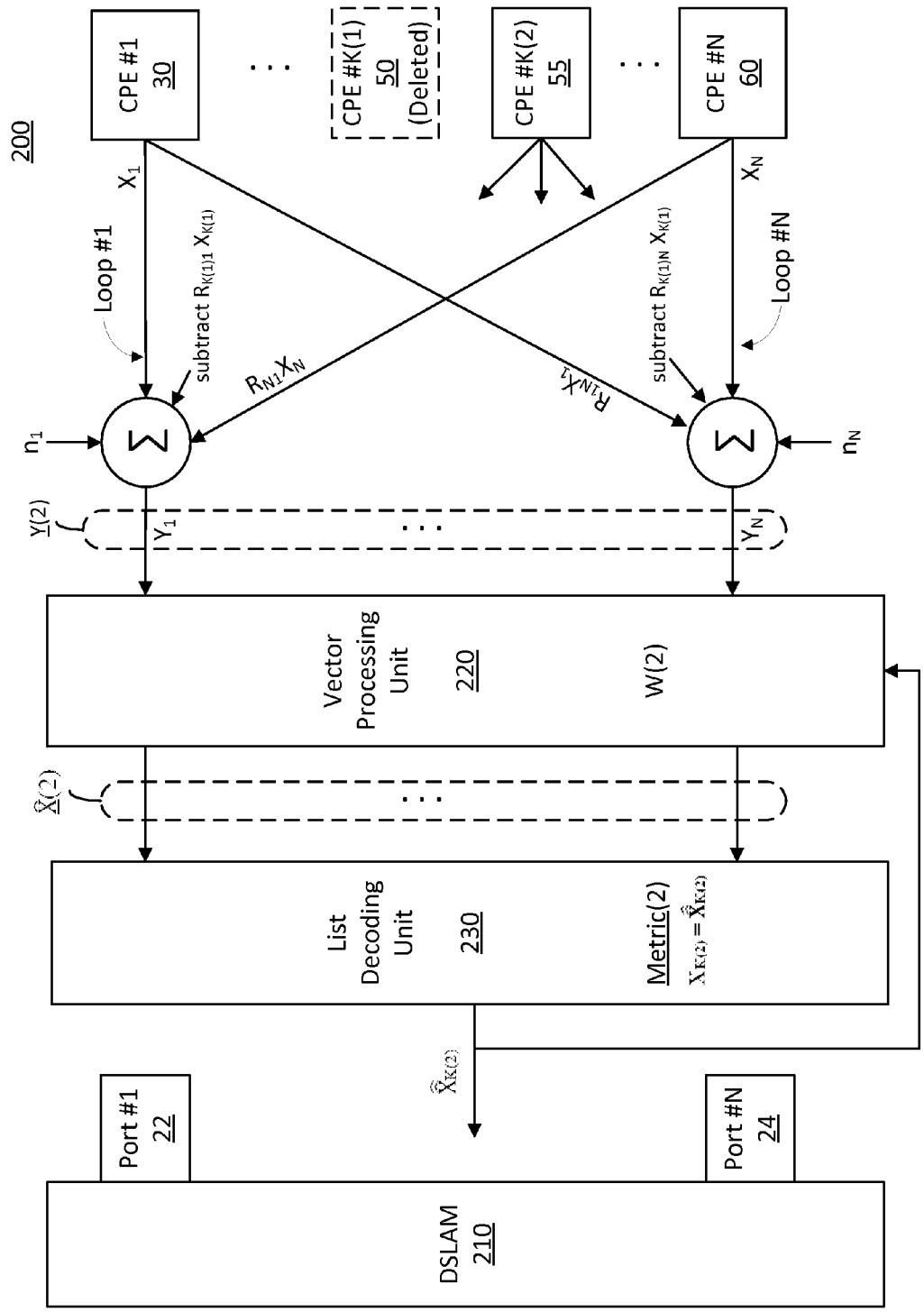
FIG. 5B shows the system of FIG. 5B after performing reduction of vectoring-enhanced noise in accordance with an example embodiment of the present invention.

FIG. 5B shows processing that occurs during Cycle(2). In this cycle, the control unit removes the K(1) component from further processing to generate a new set of vectors and matrices, as previously described. In particular, a new correlation matrix R(2) is calculated from R(1) by eliminating the K(1)th row and column. The Processing Input Vector Y(2) is also changed by deleting the direct path input from CPE K(1) 50 and subtracting the FEXT contributed by loop K(1) from each of the remaining components. For example, $R_{K(1)1}X_{K(1)}$ is subtracted from $Y_1(1)$ to form $Y_1(2)$, and $R_{K(1)N}X_{K(1)}$ is subtracted from $Y_N(1)$ to form $Y_N(2)$.

The subtraction above uses the original R matrix because the new R(2) matrix does not include the K(1)th component. It should also be noted that the Enhanced Noise Vector is now n(2) and its dimension has been reduced to N−1. The Vector Processing unit 220 repeats the processing from Cycle(1), but using W(2), which is the inverse of the new matrix R(2), to form the new Processing Output Vector $\underline{\hat{X}}(2)$. The List Decoding unit 230 calculates Metric(2) and performs List Decoding and Soft-Decision Demodulation to generate a new hard decision value $\hat{X}(2)$, which is fed back as input to Cycle(3). Other cycles then proceed in like manner up to and including Cycle (N).

Figure 6:
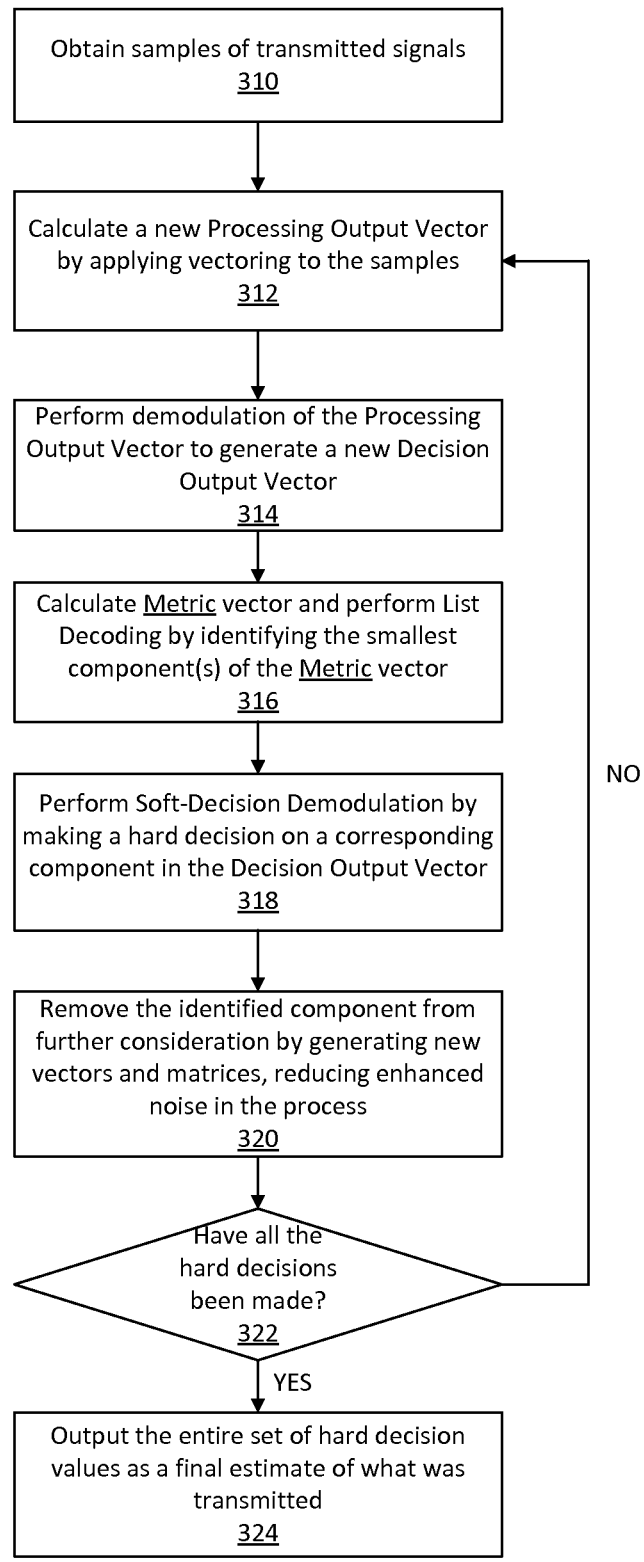
FIG. 6 is a flowchart of a method according to an example embodiment of the present invention.

FIG. 6 is a flowchart of a method 300 that summarizes the example methods previously described. The method 300 may be performed on a processor of the control unit and begins at 310, where samples of the transmitted signals are obtained, e.g., by measuring the signals at the CO end of the loop.

At 312, a new Processing Output Vector $\underline{\hat{X}}(1)$, which is basically a set of intermediate values, is calculated by applying vectoring to the samples.

At 314, the Processing Output Vector $\underline{\hat{X}}(1)$ is demodulated to generate a new Decision Output Vector $\hat{\hat{X}}(1)$. The demodulation may involve Maximum Likelihood demodulation, in which each $\underline{\hat{X}}(1)$ value is quantized to its closest allowed value.

At 316, a new Metric(1) vector is calculated from the magnitude of the difference between each $\underline{\hat{X}}(1)$ value and its corresponding $\hat{\hat{X}}(1)$ value. At least one smallest component of the Metric(1) vector is then identified.

At 318, Soft-Decision Demodulation is performed by making a hard decision on a corresponding component(s) of the Decision Output Vector $\hat{\hat{X}}(1)$ to select at least one demodulated value as a final estimate.

At 320, the identified component is removed from further consideration by generating new vectors and matrices, including refining the initial samples to calculate Processing Input Vector Y(2) by, amongst other things, removing the components of X(1) that correspond to the selected demodulated values. As previously explained, the other pertinent vectors and matrices are generated to allow vectoring to be repeated (at 312) using the newly calculated Y(2) as input to the vectoring procedure to generate $\underline{\hat{X}}(2)$ as a new set of intermediate values, which have reduced noise compared to $\underline{\hat{X}}(1)$.

At 322, it is determined whether all hard decisions have been made, i.e., whether final estimates have been selected for all the transmitted signals.

If not all of the hard decisions have been made, the method returns to 312 to reapply vectoring. Once all the hard decisions have been made, the method terminates at 324 by out-putting the entire set of hard decisions as a final estimate of what was actually transmitted.

An example embodiment of the present invention is directed to one or more processors, which may be implemented using any conventional processing circuit and device or combination thereof, e.g., Personal Computer Central Processing Unit(s), Microprocessors, Field Programmable Gate Arrays (FPGAs) and other signal processing devices, to execute instructions provided, e.g., on a hardware computer-readable medium including any conventional memory device, to perform any of the methods described herein, alone or in combination.

In the preceding specification, the present invention has been described with reference to specific example embodiments thereof. It will, however, be evident that various modifications and changes may be made thereunto without departing from the broader spirit and scope of the present invention as set forth in the claims that follow. For example, the example embodiments can be modified to have speed processing by making more than one hard decision in each cycle. If "d" such decisions are made in each cycle based on the "d" smallest components of the Metric(i) vector, then more decisions can be fed back to subsequent cycles, thus decreasing the total number of cycles from N to N/d.

The embodiments described herein may be combined with each other in various combinations. The specification and drawings are accordingly to be regarded in an illustrative rather than restrictive sense.

What is claimed is:

1. A computer-implemented method for reducing enhanced noise generated as a result of applying vectoring to signals transmitted and subsequently received over a plurality of copper telephone loops, comprising:
   at a processor of a computer, receiving a set of intermediate values corresponding to estimates of the transmitted signals, which intermediate values were generated by applying a vectoring procedure to initial samples of the received signals;
   demodulating the intermediate values;
   selecting at least one demodulated value as a final estimate of a corresponding transmitted signal;
   refining the initial samples by removing each initial sample that has a corresponding selected demodulated value; and
   repeating the vectoring procedure, the demodulating, the selecting, and the refining, using the refined samples in place of the initial samples to generate new intermediate values that have reduced noise.

2. The method of claim 1, wherein the vectoring procedure, the demodulating, the selecting, and the refining are repeated until final estimates have been selected for all the transmitted signals.

3. The method of claim 1, wherein the at least one demodulated value is selected by identifying those demodulated values that are most likely to be representative of the transmitted signals.

4. The method of claim 3, wherein the most likely values are identified by:
   calculating a difference between each intermediate value and its corresponding demodulated value; and
   selecting, as the most likely values, those demodulated values for which the magnitude of the difference is the smallest.

5. The method of claim 1, wherein the vectoring procedure is applied to remove Far End Crosstalk between the plurality of loops.

6. The method of claim 1, wherein the signals are transmitted in an upstream direction from customer devices to a central office of a telephone service provider.

7. The method of claim 1, further comprising, as part of the vectoring procedure:
   calculating the refined samples by, in addition to removing each initial sample that has a corresponding selected demodulated value:
       subtracting crosstalk contributed by each initial sample that has a corresponding selected demodulated value from each non-removed initial sample.

8. The method of claim 7, further comprising, as part of the vectoring procedure:
   refining an inverse correlation matrix by reducing a dimension of the inverse correlation matrix to reflect each removed initial sample; and
   multiplying the inverse correlation matrix with the refined samples to generate the new intermediate values.

9. The method of claim 7, wherein to calculate the crosstalk, each initial sample that has a corresponding selected demodulated value is set equal to its corresponding selected demodulated value.

10. A device for reducing enhanced noise generated as a result of applying vectoring to signals transmitted and subsequently received over a plurality of copper telephone loops, the device comprising:
    a computer processor configured to:
       receive a set of intermediate values corresponding to estimates of the transmitted signals, which intermediate values were generated by applying a vectoring procedure to initial samples of the received signals;
       demodulate the intermediate values;
       select at least one demodulated value as a final estimate of a corresponding transmitted signal;
       refine the initial samples by removing each initial sample that has a corresponding selected demodulated value; and
       repeat the vectoring procedure, the demodulating, the selecting, and the refining, using the refined samples in place of the initial samples to generate new intermediate values that have reduced noise.

11. The device of claim 10, wherein the processor is configured to repeat the vectoring procedure, the demodulating, the selecting, and the refining until final estimates have been selected for all the transmitted signals.

12. The device of claim 10, wherein the processor is configured to select at least one demodulated value by identifying those demodulated values that are most likely to be representative of the transmitted signals.

13. The device of claim 12, wherein the processor is configured to identify the most likely values by:
    calculating a difference between each intermediate value and its corresponding demodulated value; and
    selecting, as the most likely values, those demodulated values for which the magnitude of the difference is the smallest.

14. The device of claim 10, wherein the vectoring procedure is applied to remove Far End Crosstalk between the plurality of loops.

15. The device of claim 10, wherein the signals are transmitted in an upstream direction from customer devices to a central office of a telephone service provider.

16. The device of claim 10, wherein the processor is configured to, as part of the vectoring procedure:
    calculate the refined samples by, in addition to removing each initial sample that has a corresponding selected demodulated value:

subtracting crosstalk contributed by each initial sample that has a corresponding selected demodulated value from each non-removed initial sample.

17. The device of claim 16, wherein the processor is configured to, as part of the vectoring procedure:
refine an inverse correlation matrix by reducing a dimension of the inverse correlation matrix to reflect each removed initial sample; and
multiply the inverse correlation matrix with the refined samples to generate the new intermediate values.

18. The device of claim 16, wherein to calculate the crosstalk, the processor sets each initial sample that has a corresponding selected demodulated value equal to its corresponding selected demodulated value.

19. A non-transitory computer-readable medium having stored thereon instructions executable by a computer processor, the instructions which, when executed by the processor, cause the processor to perform a method for reducing enhanced noise generated as a result of applying vectoring to signals transmitted and subsequently received over a plurality of copper telephone loops, the method comprising:
at the processor, receiving a set of intermediate values corresponding to estimates of the transmitted signals, which intermediate values were generated by applying a vectoring procedure to initial samples of the received signals;
demodulating the intermediate values;
selecting at least one demodulated value as a final estimate of a corresponding transmitted signal;
refining the initial samples by removing each initial sample that has a corresponding selected demodulated value; and
repeating the vectoring procedure, the demodulating, the selecting, and the refining, using the refined samples in place of the initial samples to generate new intermediate values that have reduced noise.

20. The computer-readable medium of claim 19, wherein the instructions cause the processor to repeat the vectoring procedure, the demodulating, the selecting, and the refining until final estimates have been selected for all the transmitted signals.

* * * * *